(12) United States Patent
Zhang

(10) Patent No.: US 10,999,519 B2
(45) Date of Patent: May 4, 2021

(54) TARGET TRACKING METHOD AND DEVICE, MOVABLE PLATFORM, AND STORAGE MEDIUM

(71) Applicant: SZ DJI TECHNOLOGY CO., LTD., Shenzhen (CN)

(72) Inventor: Wei Zhang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/880,553

(22) Filed: May 21, 2020

(65) Prior Publication Data

US 2020/0288065 A1 Sep. 10, 2020

Related U.S. Application Data

(63) Continuation of application No. PCT/CN2019/089248, filed on May 30, 2019.

(51) Int. Cl.
| | |
|---|---|
| *H04N 5/232* | (2006.01) |
| *G06T 7/73* | (2017.01) |
| *G06K 9/00* | (2006.01) |
| *H04N 5/28* | (2006.01) |

(52) U.S. Cl.
CPC ....... *H04N 5/23299* (2018.08); *G06K 9/0063* (2013.01); *G06T 7/73* (2017.01); *H04N 5/28* (2013.01); *G06K 2009/00644* (2013.01)

(58) Field of Classification Search
CPC ........ H04N 5/23299; H04N 5/28; G06T 7/73; G06K 9/0063; G06K 2009/00644
See application file for complete search history.

(56) References Cited

U.S. PATENT DOCUMENTS

| | | | | |
|---|---|---|---|---|
| 9,164,506 | B1* | 10/2015 | Zang | G05D 1/0038 |
| 9,274,204 | B2* | 3/2016 | Kim | G06K 9/2018 |
| 9,774,797 | B2* | 9/2017 | Richards | H04N 5/33 |
| 2005/0128291 | A1 | 6/2005 | Murakami | |
| 2012/0105634 | A1* | 5/2012 | Meidan | G08B 13/1965 |
| | | | | 348/143 |

(Continued)

FOREIGN PATENT DOCUMENTS

| | | |
|---|---|---|
| CN | 103168467 A | 6/2013 |
| CN | 105915784 A | 8/2016 |

(Continued)

OTHER PUBLICATIONS

The World Intellectual Property Organization (WIPO) International Search Report for PCT/CN2019/089248 dated Mar. 2, 2020 7 pages (translation included).

*Primary Examiner* — Richard A Hansell, Jr.
(74) *Attorney, Agent, or Firm* — Anova Law Group, PLLC

(57) ABSTRACT

A target tracking method applicable to a shooting device including a first shooting assembly and a second shooting assembly. The method includes calling the second shooting assembly to shoot an environment to obtain an image, performing target object recognition on the image to obtain a tracking position area of a target object to be tracked in the image, and adjusting a shooting attitude of the shooting device according to the tracking position area of the target object in the image to locate the target object in a shooting frame of the first shooting assembly.

16 Claims, 5 Drawing Sheets

(56) References Cited

U.S. PATENT DOCUMENTS

| | | | |
|---|---|---|---|
| 2012/0143808 A1* | 6/2012 | Karins | G06N 7/005 706/46 |
| 2014/0253737 A1* | 9/2014 | Kempinski | G06T 7/20 348/169 |
| 2017/0108877 A1* | 4/2017 | Zang | G06K 9/0063 |
| 2017/0322551 A1* | 11/2017 | Zang | G06F 3/04883 |
| 2018/0332240 A1 | 11/2018 | Chen et al. | |
| 2019/0171201 A1* | 6/2019 | Tao | G05D 1/0038 |
| 2020/0043184 A1* | 2/2020 | Zhang | G06T 7/292 |
| 2020/0053292 A1* | 2/2020 | Janjic | G01S 19/49 |

FOREIGN PATENT DOCUMENTS

| | | |
|---|---|---|
| CN | 106506941 A | 3/2017 |
| CN | 107015572 A | 8/2017 |
| CN | 108496138 A | 9/2018 |
| WO | 2018214093 A1 | 11/2018 |

* cited by examiner

TARGET TRACKING METHOD AND DEVICE, MOVABLE PLATFORM, AND STORAGE MEDIUM

CROSS-REFERENCE TO RELATED APPLICATION

This application is a continuation of International Application No. PCT/CN2019/089248, filed May 30, 2019, the entire content of which is incorporated herein by reference.

TECHNICAL FIELD

The present disclosure generally relates to the field of image processing technology and, more particularly, to a target tracking method and device, a movable platform, and a storage medium.

BACKGROUND

Currently, target tracking generally includes performing target recognition on an image captured by a shooting device to determine a target object in the image, and adjusting a shooting attitude of the shooting device to keep the target object in a shooting frame of the shooting device, to realize tracking of the target object in a monitoring environment.

The tracking method used in current technologies is to perform the image recognition on the image shot by a visible light shooting device to determine the target object in the image, and adjust the shooting attitude of the visible light shooting device to keep the target object in the shooting frame of the visible light shooting device, to realize tracking of the target object by the visible light shooting device. Since the image captured by the visible light shooting device has rich feature information to facilitate an identification of the target object, the visible light shooting device can accurately track the target object. However, at present, the target object cannot or cannot accurately be recognized in the image output by certain types of shooting devices, and hence these types of shooting devices cannot or cannot accurately track the target object.

SUMMARY

Consistent with the disclosure, there is provided a target tracking method applicable to a shooting device including a first shooting assembly and a second shooting assembly. The method includes calling the second shooting assembly to shoot an environment to obtain an image, performing target object recognition on the image to obtain a tracking position area of a target object to be tracked in the image, and adjusting a shooting attitude of the shooting device according to the tracking position area of the target object in the image to locate the target object in a shooting frame of the first shooting assembly.

Also consistent with the disclosure, there is provided a movable platform including a shooting device including a first shooting assembly and a second shooting assembly, a memory storing a computer program including program instructions, and a processor. Imaging modes of the first shooting assembly and the second shooting assembly are different. The processor is configured to execute the program instructions to call the second shooting assembly to shoot the environment to obtain an image, perform target object recognition on the image to obtain a tracking position area of a target object to be tracked in the image, and adjust a shooting attitude of the shooting device according to the tracking position area of the target object in the image to locate the target object in a shooting frame of the first shooting assembly.

BRIEF DESCRIPTION OF THE DRAWINGS

In order to provide a clearer illustration of technical solutions of disclosed embodiments, the drawings used in the description of the disclosed are briefly described below.

DETAILED DESCRIPTION OF EMBODIMENTS

The present disclosure provides a target tracking method and device, a movable platform, and a storage medium, such that even if a target object cannot or cannot be accurately recognized in an image output by a shooting device, the shooting device can still track the target object.

The present disclosure can realize target object recognition through a second image output by a second shooting assembly in the shooting device to obtain a tracking position area of a target object in the second image. A shooting attitude of the shooting device can be adjusted according to the tracking position area of the target object in the second image, such that the target object is located in a shooting frame of a first shooting assembly in the shooting device. As such, even if the target object cannot or cannot accurately be recognized in the image output by the first shooting assembly, the first shooting assembly can still track the target object.

Figure 1:
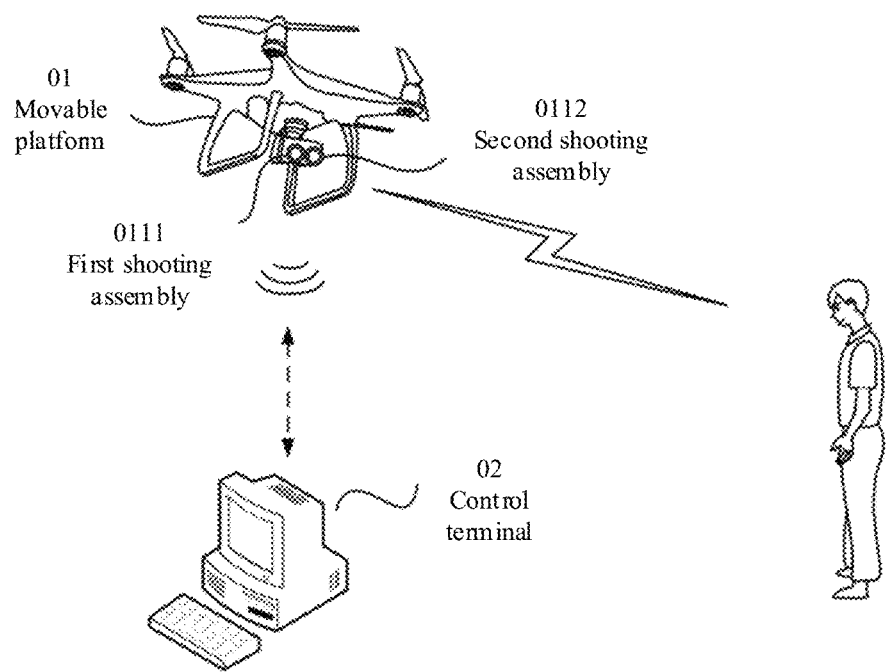
FIG. 1 is an application scenario of a target tracking method consistent with embodiments of the disclosure.

FIG. 1 is an application scenario of an example target tracking method consistent with the disclosure. The target tracking method can be applicable to a movable platform 01. The movable platform 01 may be any apparatus that can be moved by an external force or through its own power system. For example, the movable platform 01 may include an aircraft. As shown in FIG. 1, the movable platform 01 includes the shooting device configured to shoot an environment, and the shooting device may be carried on a body of the movable platform 01 directly or through a movable component (e.g., a gimbal). The shooting device includes a first shooting assembly 0111 and a second shooting assembly 0112 having different imaging modes. The movable platform 01 can adjust an attitude of a body of the movable platform 01 or adjust an attitude of the movable component connected to the shooting device on the movable platform 01 (e.g., the gimbal), to adjust the shooting device to rotate up, down, left, and right and/or translate up, down, left, right, back, and forth, thereby adjusting a shooting attitude of the shooting device. The first shooting assembly 0111 and the second shooting assembly 0112 may be fixedly connected. When the movable platform 01 performs target tracking on a target object, the second shooting assembly 0112 of the shooting device can be called first to shoot the environment including the target object (e.g., people, animal, and the like) to obtain a second image. The second image may be any type of image that facilitates the target object recognition. According to a position area of the target object in the second image, the shooting attitude of the shooting device can be then controlled, such that the target object can be always in a shooting frame of the first shooting assembly 0111. That is, the target object can be always within a shooting range of the first shooting assembly 0111. Thus, the first shooting assembly 0111 can track the target object. For example, the movable platform 01 can call the second shooting assembly 0112 to shoot the environment to obtain the second image. The target object recognition can be performed on the second image to obtain a tracking position area of the target object to be tracked in the second image. The shooting attitude of the shooting device can be adjusted according to the tracking position area of the target object in the second image, such that the target object is located in the shooting frame of the first shooting assembly 0111. Therefore, the present disclosure can use the second image to recognize the target object and the tracking position area of the target object in the second image, and adjust the shooting attitude of the shooting device according to the tracking position area of the target object in the second image, such that the target object is located in the shooting frame of the first shooting assembly 0111. Thus, the first shooting assembly can realize an indirect target tracking of the target object. The present disclose provides the target tracking method enabling the first shooting assembly 0111 to track the target object. Even if the target object cannot be accurately recognized in the image output by the first shooting assembly 0111, the first shooting assembly 0111 can still track the target object.

For example, there are two adjustment methods for adjusting the shooting attitude of the shooting device. In some embodiments, the shooting attitude of the shooting device can be adjusted directly based on the tracking position area of the target object in the second image. After the shooting attitude of the shooting device is adjusted, the target object can be in a preset position area of the shooting frame of the second shooting assembly 0112. When the target object is in the preset position area of the shooting frame of the second shooting assembly 0112, the target object can be in the target position area, which corresponds to the preset position area, in the shooting frame of the first shooting assembly 0111. The target position area can be a central position area.

Before adjusting the shooting attitude of the shooting device based on the tracking position area of the target object in the second image, a regional correspondence between the images captured by the first shooting assembly 0111 and the second shooting assembly 0112 needs to be determined. For example, when the target object is maintained in the image captured by the first shooting assembly 0111, a position range of the target object in the image captured by the second shooting assembly 0112 can be used as the preset position area. In some embodiments, when the target object is maintained in the image captured by the first shooting assembly 0111, a position range of the target object in the image captured by the second shooting assembly 0112 can be used as the preset position area. Therefore, the tracking position area of the target object in the second image can be determined, and the shooting attitude of the shooting device can be adjusted directly based on the position of the target object in the second image. As such, the target object can be in the preset position area of the image captured by the second shooting assembly 0112. That is, the target object can be ensured to locate in the shooting frame of the first shooting assembly 0111. It is further ensured that the target object can be located in the target position area, which corresponds to the preset position area, in the shooting frame of the first shooting assembly 0111.

In some other embodiments, according to the tracking position area of the target object in the second image, the tracking position area of the target object in the shooting frame of the first shooting assembly 0111 can be determined. The shooting attitude of the shooting device can be adjusted according to the tracking position area of the target object in the shooting frame of the first shooting assembly 0111, such that the target object is in the shooting frame of the first shooting assembly 0111. Furthermore, the target object can be in the target position area in the shooting frame of the first shooting assembly 0111. For example, according to the tracking position area of the target object in the second image and a relative positional relationship between the first shooting assembly 0111 and the second shooting assembly 0112, the tracking position area of the target object in the shooting frame of the first shooting assembly 0111 can be determined. According to the tracking position area of the target object in the shooting frame of the first shooting assembly 0111, the shooting attitude of the shooting device can be adjusted, such that the target object is located in the shooting frame of the first shooting assembly 0111. For example, the target object can be in the target position area in the shooting frame of the first shooting assembly 0111.

Therefore, the tracking position area of the target object in the shooting frame of the first shooting assembly 0111 can be determined according to the tracking position area of the target object in the second image and the relative positional relationship between the first shooting assembly 0111 and the second shooting assembly 0112. The shooting device can be then adjusted based on the tracking position area of the target object in the shooting frame of the first shooting assembly 0111. For example, because the relative position between the first shooting assembly 0111 and the second shooting assembly 0112 may be fixed, or, the relative position may be not fixed but can be measured by a sensor in the movable platform 01, and thus, the relative position between the first shooting assembly 0111 and the second shooting assembly 0112 can be known or knowable. The relative positional relationship between the first shooting assembly 0111 and the second shooting assembly 0112, i.e., a position conversion relationship between corresponding pixel points of a first image captured by the first shooting assembly 0111 and the second image captured by the second shooting assembly 0112, can be determined according to relative positions between the first shooting assembly 0111 and the second shooting assembly 0112. As such, the present disclosure can quickly obtain the tracking position area of the target object in the shooting frame of the first shooting assembly 0111 according to the tracking position area of the target object in the second image.

Figure 2:
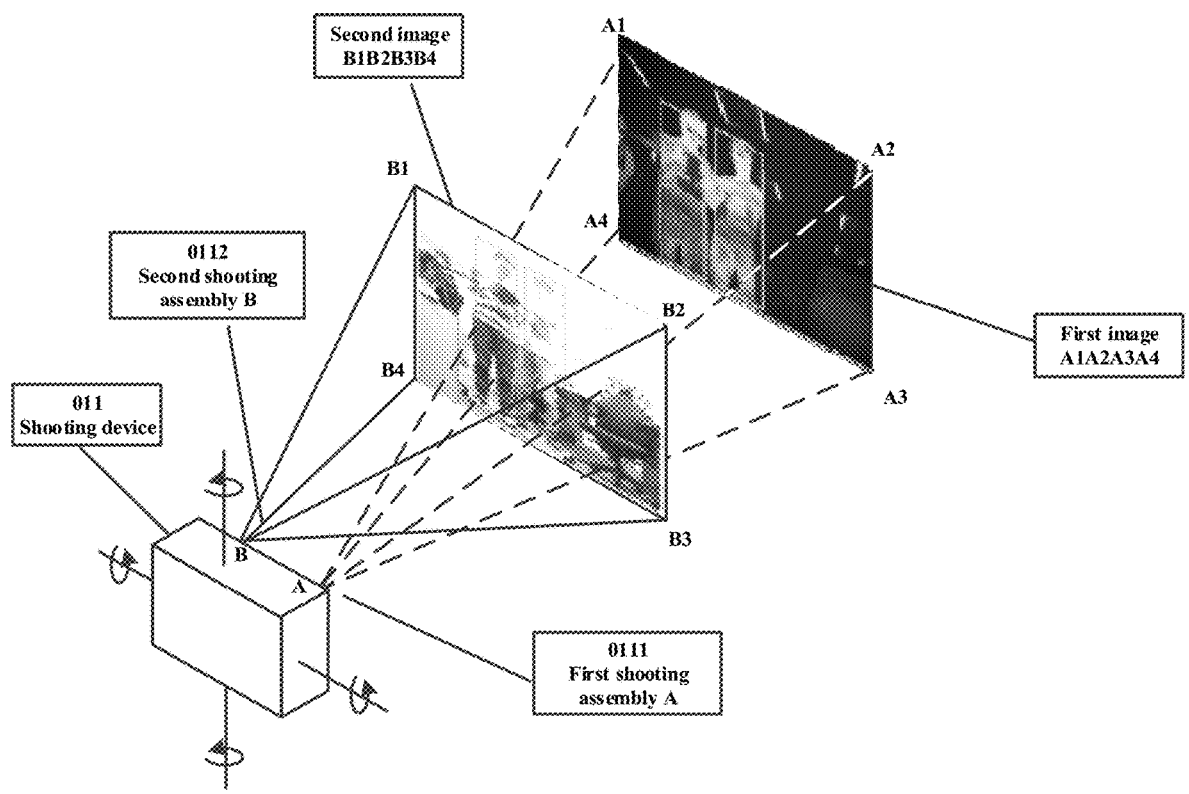
FIG. 2 is a schematic diagram of an imaging process of a shooting device consistent with embodiments of the disclosure.

FIG. 2 is a schematic diagram of an imaging process of an example shooting device 011 consistent with the disclosure. As shown in FIG. 2, the shooting device 011 will be described below with an example in which the relative position between the first shooting assembly 0111 and the second shooting assembly 0112 is fixed, the first shooting assembly 0111 can include a thermal infrared shooting device, a first image captured by the first shooting assembly 0111 can include a thermal infrared image and can be an image corresponding to the shooting frame of the first shooting assembly 0111, the second shooting assembly 0112 can include a visible light shooting device, and a second image captured by the second shooting assembly 0112 can include an optical image.

In one embodiment, as shown in FIG. 2, the shooting device 011 on the movable platform 01 includes a dual-light camera. The relative position between the first shooting assembly 0111 and the second shooting assembly 0112 in the dual-light camera can be fixed. The first shooting assembly 0111 can include the thermal infrared shooting device and the first image can include the thermal infrared image. The second shooting assembly 0112 can include the visible light shooting device and the second image can include the optical image.

When the movable platform 01 calls the shooting device 011 to shoot the environment including the target object (e.g., one of two people), the first shooting assembly 0111 can shoot the environment in a thermal infrared imaging mode to obtain the thermal infrared image A1A2A3A4 as the first image, and the second shooting assembly 0112 can shoot the environment in a visible light imaging mode to obtain the optical image B1B2B3B4 as the second image. Assume that a first pixel on the first image A1A2A3A4 corresponds to a second pixel on the second image B1B2B3B4, i.e., the first pixel and the second pixel are imaged for a same target point on the target object. Since the relative position between the first shooting assembly 0111 and the second shooting assembly 0112 in the dual-light camera is fixed, external parameters of the two shooting assemblies in the dual-light camera can be known. The external parameters can be used to indicate the relative position of the two shooting assemblies, which can be determined according to a relative installation position and a relative installation angle of the two shooting assemblies. Internal parameters of the two shooting assemblies (determined according to a focal length of the shooting assembly and a position of an optical center) can be also known. Therefore, the second pixel in the second image can be easily projected to the first pixel in the first image. For example, assume that the coordinate of a target point on the target object in the camera coordinate system of the first shooting assembly 0111 are $(X_1, Y_1, Z_1)$. $X_1$, $Y_1$, and $Z_1$ are a horizontal coordinate value, a vertical coordinate value, and a depth coordinate value. A relative positional offset between the second shooting assembly and the first shooting assembly can be $(\Delta X, \Delta Y, \Delta Z)$, and thus, a coordinate of the target object in the camera coordinate system of the second shooting assembly 0112 can be $(X_1+\Delta X, Y_1+\Delta Y, Z_1+\Delta Z)$. A coordinate of the first pixel of the target point of the target object in the first image captured by the first shooting assembly 0111 can be $(u_1, v_1)$, and a coordinate of the second pixel of the target point in the second image captured by the second shooting assembly 0112 can be $(u_2, v_2)$. The coordinate of the first pixel and the coordinate of the second pixel can have the following relative positional relationship:

$$\left.\begin{aligned} u_1 &= \frac{f_1 X_1}{Z_1}, v_1 = \frac{f_1 Y_1}{Z_1} \\ u_2 &= \frac{f_2(X_1+\Delta X)}{Z_1+\Delta Z}, v_2 = \frac{f_2(Y_1+\Delta Y)}{Z_1+\Delta Z} \end{aligned}\right\} \Rightarrow$$

$$\left.\begin{aligned} \frac{u_1}{u_2} &= \frac{f_1 X_1}{f_2(X_1+\Delta X)} * \frac{Z_1+\Delta Z}{Z_1} \approx \frac{f_1}{f_2} \\ \frac{v_1}{v_2} &= \frac{f_1 Y_1}{f_2(Y_1+\Delta Y)} * \frac{Z_1+\Delta Z}{Z_1} \approx \frac{f_1}{f_2} \end{aligned}\right\}$$

where $f_1$ and $f_2$ are the focal lengths of the first shooting assembly 0111 and the second shooting assembly 0112.

An observation depth of the target object can be generally above 5 m, i.e., $Z_1 > 5$ m, and the relative positional offset between the two shooting assemblies, $(\Delta X, \Delta Y, \Delta Z)$, can be very small. For example, a Euclidean distance d between the two shooting assemblies can be $d = \sqrt{\Delta X^2 + \Delta Y^2 + \Delta Z^2} \approx 0.02$ m. Therefore, $Z_1 \gg \Delta X, \Delta Y, \Delta Z$ and the relative position offset can be ignored, and the relative positional relationship between the first pixel in the first image and the second pixel in the second image can be obtained as $u_1/u_2 = f_1/f_2$ and $v_1/v_2 = f_1/f_2$. It can be seen that, according to the position of the second pixel in the second image and the relative positional relationship between the first shooting assembly and the second shooting assembly, the position of the first pixel in the first image can be easily obtained through conversion.

The thermal infrared imaging mode can refer to that the thermal infrared shooting device can detect an infrared radiation emitted by the object itself, and convert a temperature distribution of the object into the thermal infrared image through photoelectric conversion, signal processing, and other means. Therefore, the first image A1A2A3A4 obtained by the thermal infrared mode can reflect the temperature distribution information of the object having thermal radiation. Objects having thermal radiation can include, for example, people, animals, electromagnetic equipment, and the like. The thermal imaging mode has the advantage of being able to shoot without light and with an occlusion. It can shoot objects well at night or in other special environments. The imaging principle of the visible light imaging mode, e.g., red-green-blue (RGB) imaging mode and the like, can be to use a reflection of visible light from a surface of the object for imaging. The optical image B1B2B3B4 obtained by imaging can include detailed information such as the color and shape of the object, but the imaging result can be greatly affected by light and occlusion.

Although the relative position of the first shooting assembly 0111 and the second shooting assembly 0112 may or may not be fixed, both the first shooting assembly 0111 and the second shooting assembly 0112 can shoot the same target object in the environment. Because the imaging modes of the first shooting assembly 0111 and the second shooting assembly 0112 are different, sizes of the images obtained by the first shooting assembly 0111 and the second shooting assembly 0112 in the shooting environment may be different. For example, due to technical limitations, a range of infrared imaging can be smaller than that of visible light imaging. Generally, the image obtained by infrared imaging can be smaller than the image obtained by visible light imaging. The positions of the target object in the first image and the second image can be different. Since the relative positional relationship between the first shooting assembly 0111 and the second shooting assembly 0112 can be determined, once the position of the target object in one image is determined, the position of the target object in another image can be easily obtained through conversion.

The thermal infrared image has insufficient texture information compared to the optical image. If the target recognition and tracking are directly performed on the thermal infrared image, the effect can be very poor. But thermal infrared images have the advantage that they can image objects with thermal radiation in the environment without being hindered by light and occlusion. The target tracking method based on the thermal infrared image can have very important practical significance. The present disclosure can use the optical image output by the visible light shooting device to realize the target object recognition to obtain the tracking position area of the target object in the optical image. The shooting attitude of the shooting device can be adjusted according to the tracking position area of the target object in the optical image, such that the target object is located in the shooting frame of the thermal infrared shooting device in the shooting device. As such, even if the thermal infrared image output by the thermal infrared camera cannot or cannot accurately recognize the target object, the thermal infrared camera can still track the target object.

In one embodiment, the user can specify the target object to be tracked based on the first image output by the first shooting assembly 0111, so as to achieve the tracking of the target object. For example, referring back to FIG. 1, after the first shooting assembly 0111 and the second shooting assembly 0112 shoot the environment to obtain the first image and the second image, the movable platform 01 can send the first image to a control terminal 02 to cause the control terminal 02 to display the first image. The user can perform a selection operation on the first image displayed on the control terminal 02, for example, frame an area including the target object to be tracked on the first image. The control terminal 02 can generate first area indication information according to the area including the target object to be tracked, and send the first area indication information to the movable platform 01. After receiving the first area indication information sent by the control terminal 02, the movable platform 01 can determine second area indication information of the second image according to the first area indication information and the relative positional relationship between the first shooting assembly 0111 and the second shooting assembly 0112. The movable platform 01 can perform the target recognition on the area indicated by the second area indication information in the second image to determine the target object and obtain the tracking position area of the target object in the second image. For example, the target recognition can be performed on the area indicated by the second area indication information in the second image, and the target object can be recognized in the area. The recognition may be recognized through a neural network. After the target object is determined, the determined target object may be recognized from the second image output by the second shooting assembly 0112 to obtain the tracking position area of the target object in the second image. Furthermore, the recognition of the determined target object from the second image output by the second shooting assembly 0112 may be recognized using the neural network, or by image tracking.

In one embodiment, the user can view target tracking result based on the first image at the control terminal 02. After the tracking position area of the target object in the second image is determined, the tracking position area of the target object in the first image can be determined according to the tracking position area of the target object in the second image and the relative positional relationship between the first shooting assembly 0111 and the second shooting assembly 0112. The target object can be marked in the first image according to the tracking position area of the target object in the first image. All or some of image information in the second image information can be added to the marked first image to enrich contour features of the marked first image. Finally, the marked first image can be sent to the control terminal 02, such that the control terminal 02 can display the marked first image.

It can be understood that the system architecture and application scenarios described in the embodiments of the present disclosure are intended to more clearly explain the technical solutions of the embodiments of the present disclosure, and do not constitute a limitation on the technical solutions provided by the embodiments of the present disclosure. Those of ordinary skill in the art may know that with the evolution of the system architecture and the emergence of new application scenarios, the technical solutions provided by the embodiments of the present disclosure can be also applicable to similar technical problems.

Figure 3:
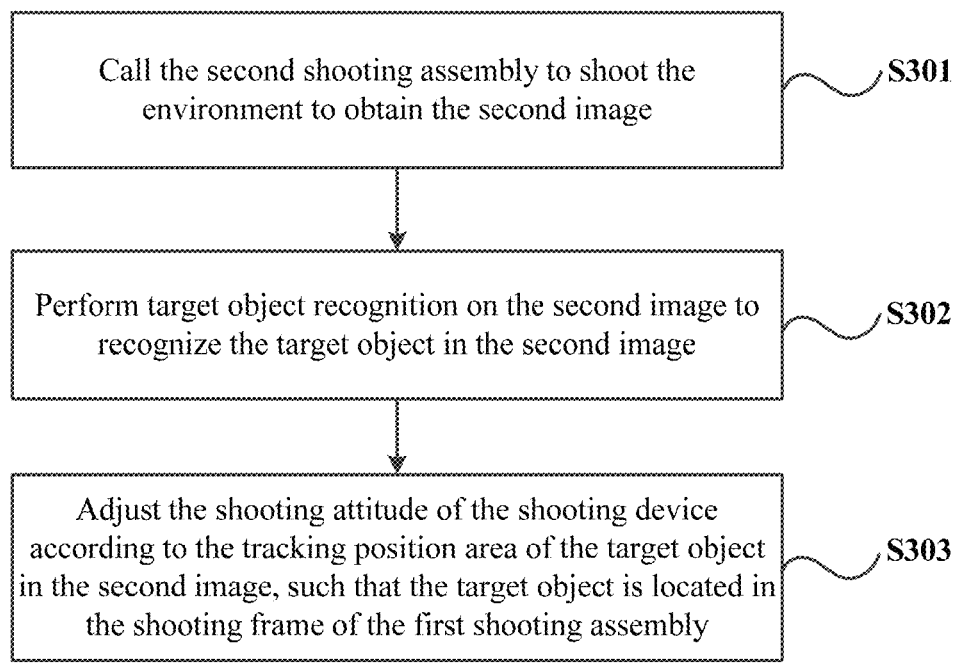
FIG. 3 is a flow chart of a target tracking method consistent with embodiments of the disclosure.

FIG. 3 is a flow chart of an example target tracking method consistent with the disclosure. The target tracking method may be executed by a movable platform, for example, the movable platform 01 in FIG. 1.

At S301, the movable platform calls the second shooting assembly to shoot the environment to obtain the second image, and calls the first shooting assembly to shoot the environment to obtain the first image at the same time. The first shooting assembly can include the thermal infrared imaging device and the second shooting assembly can include the visible light imaging device. The imaging modes of the first shooting assembly and the second shooting assembly can be different. The first shooting assembly can use the thermal infrared imaging mode to obtain the thermal infrared image as the first image, and the second shooting assembly can use the visible light imaging mode to obtain the optical image as the second image. The second image can include the optical image.

Due to the different imaging modes of the first shooting assembly and the second shooting assembly, the positions of the target object in the first image and the second image may be different. Since the relative positional relationship between the first shooting assembly and the second shooting assembly can be determined, once the position of the target object in one image is determined, the position of the target object in another image can be easily obtained through conversion.

At S302, target object recognition is performed on the second image to recognize the target object in the second image, and the tracking position area of the target object to be tracked in the second image is obtained using segmentation. Target object recognition can determine the target object and the tracking position area of the target object in the second image through image processing methods of target detection and target segmentation. The target detection and target segmentation may include a conventional target detection method and a conventional segmentation method, or may include a target detection method and a target segmentation method based on deep learning (e.g., a neural network), which is not limited in here.

At 303, the shooting attitude of the shooting device is adjusted according to the tracking position area of the target object in the second image, such that the target object is located in the shooting frame of the first shooting assembly. The movable platform can adjust the shooting attitude of the shooting device by changing the attitude of the movable platform itself (e.g., the body), or control the shooting device to adjust the shooting attitude through the gimbal connected to the shooting device, i.e., adjust the shooting attitude of the shooting device by adjusting the attitude of the gimbal.

The relative position between the first shooting assembly and the second shooting assembly can be known, and the corresponding relationship between the first image and the second image can be also known. Therefore, when the target object is in the preset position area in the second image, the target object should also be in the shooting frame of the first shooting assembly. Furthermore, the target object can be in the target position area of the shooting frame. Adjusting the shooting attitude of the shooting device according to the tracking position area of the target object in the second image may include adjusting the shooting attitude of the shooting device according to the tracking position area of the target object in the second image, such that after the shooting attitude of the shooting device is adjusted, it can be ensured that the target object is in the preset position area of the image captured by the second shooting assembly. Therefore, the target object can be located in the shooting frame of the first shooting assembly, and further, it can be in the target position area of the shooting frame.

In some embodiments, it can be ensured that after the shooting attitude of the shooting device is adjusted, the target object is in the shooting frame of the first shooting assembly, and further, the target object can be in the target position area of the shooting frame. For example, adjusting the shooting attitude of the shooting device according to the tracking position area of the target object in the second image may also include determining the tracking position area of the target object in the shooting frame of the first shooting assembly according to the tracking position area of the target object in the second image, and adjusting the shooting attitude of the shooting device according to the tracking position area of the target object in the shooting frame of the first shooting assembly.

The thermal infrared image has insufficient texture information compared to the optical image. If the target recognition and tracking are directly performed on the thermal infrared image, the effect can be very poor. But thermal infrared images have the advantage that they can image objects having thermal radiation in the environment without being hindered by light and occlusion. Therefore, the target tracking method based on thermal infrared images can be very important. The present disclosure can solve the problem very well, because the present disclosure can use the optical image output by the visible light shooting device to recognize the target object to obtain the tracking position area of the target object in the optical image. The shooting attitude of the shooting device can be adjusted according to the tracking position area of the target object in the optical image, such that the target object is located in the shooting frame of the thermal infrared shooting device in the shooting device. In this way, even if the target object cannot be or cannot be accurately recognized in the thermal infrared image output by the thermal infrared shooting device, the thermal infrared shooting device can still track the target object.

In one embodiment, after the first image and the second image are obtained in the shooting environment of the two shooting assemblies of the shooting device, the first image can be first sent to the control terminal of the movable platform, such that the control terminal can display the first image. Thus, the user can perform the selection operation on the first image on the control terminal (e.g., frame the area where the target object is located), and then the terminal device can obtain the first area indication information for indicating the selected area of the user in the first image according to the selection operation, and send the first area indication information to the movable platform. After the movable platform receives the first area indication information, the processes described above can be used to determine the position of the target object in the first image according to the tracking position area of the target object in the second image. The second area indication information can be determined according to the first area indication information and the relative positional relationship between the first shooting assembly and the second shooting assembly. The second area indication information can be used to indicate the area in the first image mapped from the area selected by the user in the second image, and finally, the target recognition can be performed on the area indicated by the second area indication information in the second image to determine the target object, and obtain the tracking position area of the target object in the second image.

Therefore, when multiple objects are included in the environment, the user can specify the target object, and a target tracking efficiency of the target tracking can be improved.

In one embodiment, after the tracking position area of the target object in the second image is determined at S301, the tracking position area of the target object in the first image can be determined according to the tracking position area of the target object in the second image. According to the tracking position area of the target object in the first image, the target object can be then marked in the first image (e.g., as shown in the first image in FIG. 2, the location of the target object can be framed). The marked first image can be sent to the control terminal of the movable platform to cause the control terminal to display the marked first image. Determining the tracking position area of the target object in the first image according to the tracking position area of the target object in the second image has been described in connection with FIGS. 1 and 2, and detailed description thereof is omitted herein.

The present disclosure can determine the target object in the tracking position area of the second image by performing the target object recognition on the second image. The tracking position area of the target object in the first image can be determined according to the tracking position area of the target object in the second image, and the target object can be marked in the first image, and the marked target object can be showed to the user through the control terminal. Therefore, indirect target tracking based on the first image can be realized, especially when the first image is the thermal infrared image. The present disclosure can achieve the target tracking based on the thermal infrared image, which has very important practical value.

In one embodiment, after the target object is marked in the first image, all or some of the image information in the second image information can be first extracted, and all or some of the image information in the second image information can be added to the marked first image to enrich the contour features of the marked first image. The marked first image can be sent to the control terminal, such that the first image finally presented to the user on the control terminal not only can be marked with the target object, but also can have greatly enriched details. A defect that the details of the image, e.g., the thermal imaging image or the like, are not rich can be improved to a certain extent.

Therefore, the present disclosure can achieve not only the target tracking based on the thermal imaging image, but also an interaction with the user through the thermal imaging image, and use the details of the optical image to enrich the contour details of the thermal imaging image that is not rich in details. The practicality of thermal imaging images can be greatly improved.

Figure 4:
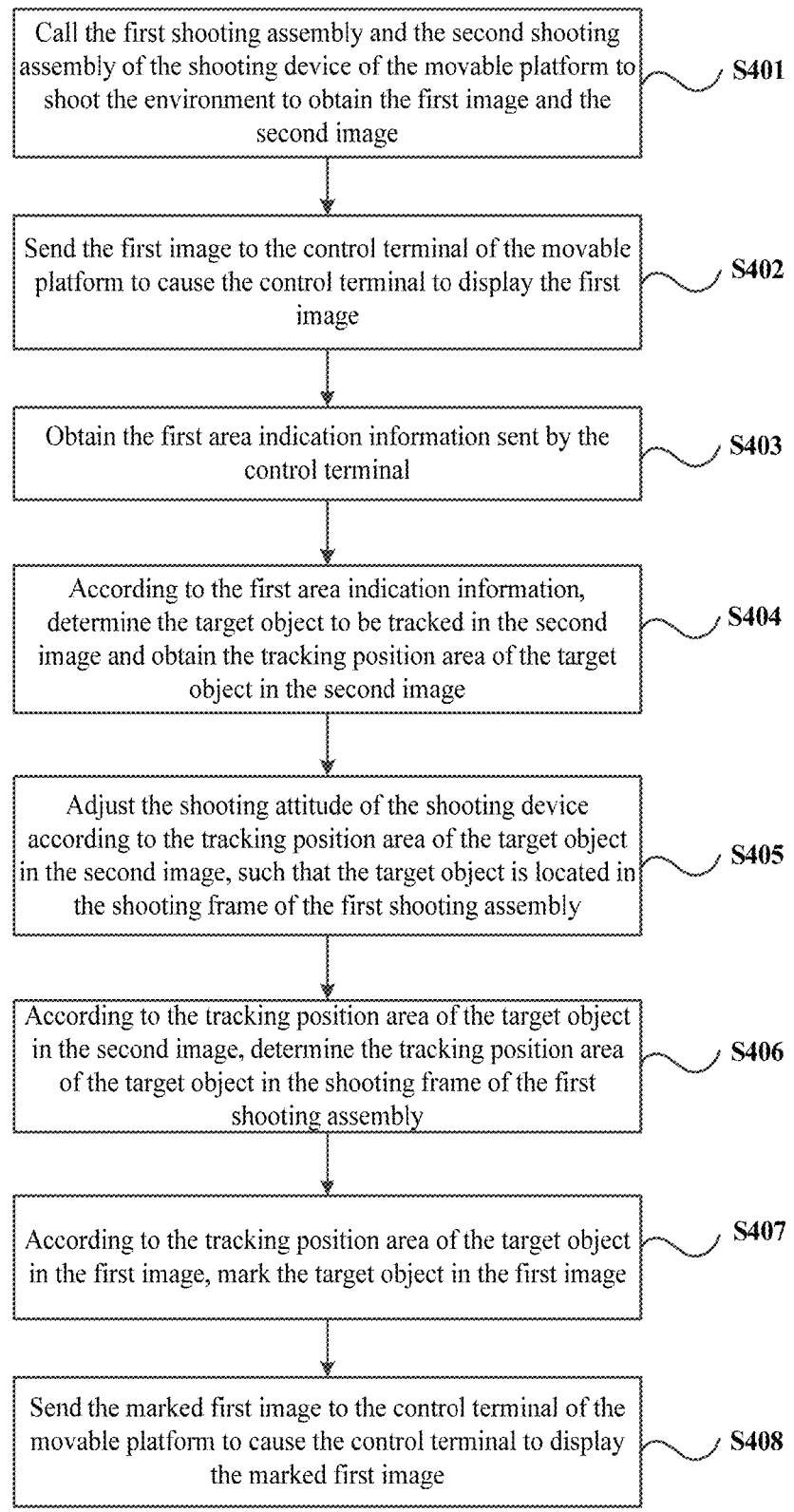
FIG. 4 is a flow chart of another target tracking method consistent with embodiments of the disclosure.

FIG. 4 is a flow chart of another example target tracking method consistent with the disclosure, and the target tracking method may be executed by a movable platform, e.g., the movable platform 01 in FIG. 1.

As shown in FIG. 4, at S401, the first shooting assembly and the second shooting assembly of the shooting device of the movable platform are called to shoot the environment to obtain the first image and the second image. The first shooting assembly can include the thermal infrared imaging device and the second shooting assembly can include the visible light imaging device. The imaging modes of the first shooting assembly and the second shooting assembly can be different. The first shooting assembly can use the thermal infrared imaging mode to obtain the thermal infrared image as the first image, and the second shooting assembly can use the visible light imaging mode to obtain the optical image as the second image. The second image can include the optical image.

At S402, the first image is sent to the control terminal of the movable platform to cause the control terminal to display the first image.

At S403, the first area indication information sent by the control terminal is obtained.

At S404, according to the first area indication information, the target object to be tracked in the second image is determined, and the tracking position area of the target object in the second image is obtained. For example, the second area indication information can be determined according to the first area indication information and the relative positional relationship between the first shooting assembly and the second shooting assembly. The target recognition can be performed on the area indicated by the second area indication information in the second image to determine the target object, and obtain the tracking position area of the target object in the second image.

At S405, the shooting attitude of the shooting device is adjusted according to the tracking position area of the target object in the second image, such that the target object is located in the shooting frame of the first shooting assembly. The movable platform can adjust the shooting attitude of the shooting device by changing the attitude of the movable platform itself, or control the shooting device to adjust the shooting attitude through the gimbal connected to the shooting device, i.e., adjust the shooting attitude of the shooting device by adjusting the attitude of the gimbal.

For example, adjusting the shooting attitude of the shooting device according to the tracking position area of the target object in the second image may include adjusting the target object to the preset position area of the image captured by the second shooting assembly, such that the target object is in the shooting frame of the first shooting assembly, and furthermore, can be in the target position area of the shooting frame.

In some embodiments, adjusting the shooting attitude of the shooting device according to the tracking position area of the target object in the second image may include determining the tracking position area of the target object in the shooting frame of the first shooting assembly according to the tracking position area of the target object in the second image, and the relative positional relationship between the first shooting assembly and the second shooting assembly, and adjusting the shooting attitude of the shooting device according to the tracking position area of the target object in the shooting frame of the first shooting assembly, such that the target object is in the shooting frame of the first shooting assembly, furthermore, can be in the target position area of the shooting frame.

At S406, according to the tracking position area of the target object in the second image, the tracking position area of the target object in the shooting frame of the first shooting assembly is determined. For example, according to the tracking position area of the target object in the second image and the relative positional relationship between the first shooting assembly and the second shooting assembly, the tracking position area of the target object in the first image can be determined.

At S407, according to the tracking position area of the target object in the first image, the target object is marked in the first image.

In one embodiment, after the target object is marked in the first image, the detailed information in the second image is extracted to enrich the contour features in the first image. For example, all or some of the image information in the second image information can be first extracted, and all or some of the image information in the second image information can be added to the marked first image to enrich the contour features of the marked first image.

At S408, the marked first image is sent to the control terminal of the movable platform to cause the control terminal to display the marked first image.

It should be noted that the above description of the various embodiments tends to emphasize the differences between the various embodiments. The same aspects or similarities of the various embodiments can be referred to each other, and for the sake of brevity, they will not be repeated here.

The first image can be also referred to as a "displaying image," and the second image can be also referred to as a "tracking image."

Figure 5:
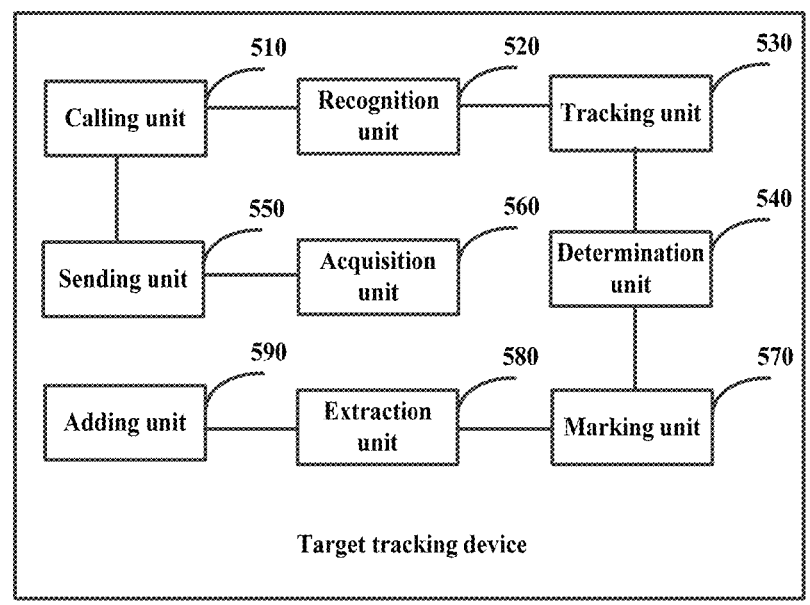
FIG. 5 is a schematic diagram of a target tracking device consistent with embodiments of the disclosure.

FIG. 5 is a schematic diagram of an example target tracking device consistent with the disclosure. The target tracking device can implement the target tracking method in FIGS. 3 and 4. The target tracking device can be applied to a movable platform, for example, the movable platform 01 in FIG. 1. The movable platform can include the shooting device, and the shooting device can include the first shooting assembly and the second shooting assembly. The target tracking device includes a calling circuit 510, a recognition circuit 520, and a tracking circuit 530. The calling circuit 510 can be configured to call the second shooting assembly to shoot the environment to obtain the second image, and the imaging modes of the first shooting assembly and the second shooting assembly can be different. The recognition circuit 520 can be configured to perform the target object recognition on the second image to obtain the tracking position area of the target object to be tracked in the second image. The tracking circuit 530 can be configured to adjust the shooting attitude of the shooting device according to the tracking position area of the target object in the second image, such that the target object is located in the shooting frame of the first shooting assembly.

For example, the movable platform can include the gimbal carrying the shooting device, and the tracking unit 530 can be further configured to adjust the attitude of the movable platform and/or the attitude of the gimbal to adjust the shooting attitude of the shooting device according to the tracking position area of the target object in the second image.

The first shooting assembly can include the thermal infrared imaging device, the second shooting assembly can include the visible light imaging device, and the second image can include the optical image.

For example, the tracking unit 530 can be specifically configured to adjust the shooting attitude of the shooting device according to the tracking position area of the target object in the second image. After the shooting attitude of the shooting device is adjusted, the target object can be located in the preset position area of the shooting frame of the second shooting assembly.

In some embodiment, the target tracking device can further include a determination circuit 540 configured to determine the tracking position area of the target object in the shooting frame of the first shooting assembly according to the tracking position area of the target object in the second image. The tracking unit 530 can be further configured to adjust the shooting attitude of the shooting device according to the tracking position area of the target object in the shooting frame of the first shooting assembly.

In one embodiment, the calling unit 510 can be further configured to call the first shooting assembly to shoot the environment to obtain the first image. The target tracking device can further include a sending unit 550 configured to send the first image to the control terminal of the movable platform to cause the control terminal to display the first image. The target tracking device can further include an acquisition unit 560 configured to obtain the first area indication information sent by the control terminal. The first area indication information can be determined by the control terminal by detecting the user's selection operation of the target object on the first image displayed by the control terminal. The recognition unit 520 can be further configured to determine the target object to be tracked in the second image and obtain the tracking position area of the target object in the second image according to the first area indication information.

In one embodiment, the recognition unit 520 can be further configured to determine the second area indication information of the second image according to the first area indication information and the relative positional relationship between the first shooting assembly and the second shooting assembly, and perform the target recognition on the area indicated by the second area indication information in the second image to determine the target object and obtain the tracking position area of the target object in the second image.

In one embodiment, the calling unit 510 can be further configured to call the first shooting assembly to shoot the environment to obtain the first image. The determination unit 540 can be further configured to determine the tracking position area of the target object in the shooting frame of the first shooting assembly according to the tracking position area of the target object in the second image. The target tracking device can further include a marking unit 570 configured to mark the target object in the first image according to the tracking position area of the target object in the shooting frame of the first shooting assembly. The sending unit 550 can be further configured to send the marked first image to the control terminal of the movable platform, such that the control terminal can display the marked first image.

In one embodiment, the target tracking device can further include an extraction unit 580 configured to extract all or some of the image information in the second image information. The target tracking device can further include an adding unit 590 configured to add all or some of the image information in the second image information to the marked first image to enrich the contour features of the marked first image.

In one embodiment, the determination unit 540 can be further configured to determine the tracking position area of the target object in the first image according to the tracking position area of the target object in the second image and the relative positional relationship between the first shooting assembly and the second shooting assembly.

Figure 6:
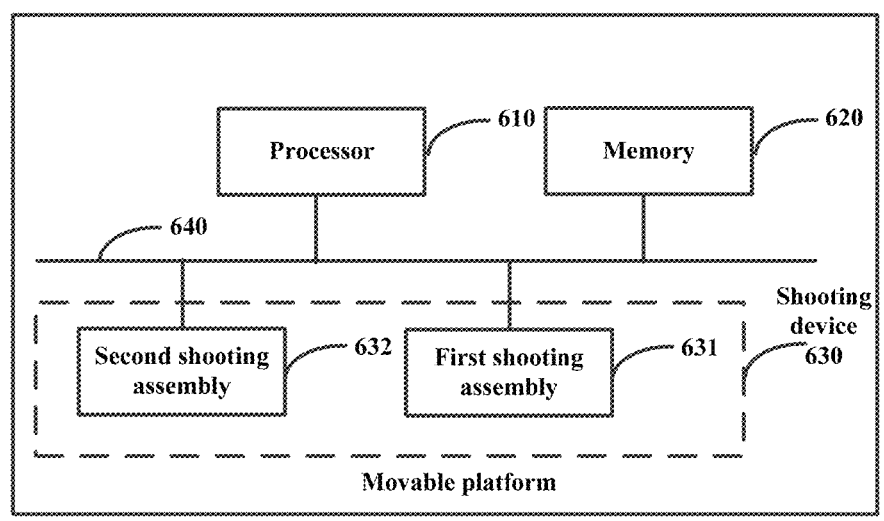
FIG. 6 is a structural diagram of a movable platform consistent with embodiments of the disclosure.

FIG. 6 is a structural diagram of an example movable platform consistent with the disclosure. The movable platform may at least include a processor 610, a memory 620, and a shooting device 630. The shooting device includes a first shooting assembly 631 and a second shooting assembly 632. The processor 610, the memory 620, and the shooting device 630 may be connected through a bus 640 or other means. FIG. 6 takes a connection through the bus as an example. The memory 620 may be configured to store the computer program. The computer program can include the program instructions. The processor 610 may be configured to execute the program instructions stored in the memory 620.

In one embodiment, the processor 610 may be a central processing unit (CPU), and the processor may also be another general-purpose processor, i.e., a microprocessor or any conventional processor, such as a digital signal processor (DSP), an Application Specific Integrated Circuit (ASIC), a Field-Programmable Gate Array (FPGA) or other programmable logic device, discrete gate or transistor logic device, discrete hardware component, and the like.

The memory 620 may include a read-only memory and a random access memory, and provide instructions and data to the processor 610. Therefore, the processor 610 and the memory 620 are not limited herein.

In the embodiments of the present disclosure, the processor 610 can load and execute one or more instructions stored in the computer storage medium to implement some or all processes of the methods in FIGS. 3 and 4. In some embodiment, at least one instruction in the computer storage medium can be loaded and executed by the processor 610.

In some embodiments, the shooting device 630 can be configured to shoot the environment.

The memory 620 can be configured to store the computer program and the computer program can include the program instructions.

The processor 610 can be configured to call the program instructions and configured to call the second shooting assembly to shoot the environment to obtain the second image, the imaging modes of the first shooting assembly and the second shooting assembly being different, perform the target object recognition on the second image to obtain the tracking position area of the target object to be tracked in the second image, adjust the shooting attitude of the shooting device according to the tracking position area of the target object in the second image, such that the target object is located in the shooting frame of the first shooting assembly.

In some embodiments, the processor 610 can be specifically configured to adjust the attitude of the movable platform and/or the attitude of the gimbal to adjust the shooting attitude of the shooting device according to the tracking position area of the target object in the second image.

The first shooting assembly can include the thermal infrared imaging device, the second shooting assembly can include the visible light imaging device, and the second image can include the optical image.

In some embodiments, the processor 610 can be further configured to adjust the shooting attitude of the shooting device according to the tracking position area of the target object in the second image. After the shooting attitude of the shooting device is adjusted, the target object can be located in the preset position area of the shooting frame of the second shooting assembly.

In some embodiments, the processor can be further configured to determine the tracking position area of the target object in the shooting frame of the first shooting assembly according to the tracking position area of the target object in the second image, and adjust the shooting attitude of the shooting device according to the tracking position area of the target object in the shooting frame of the first shooting assembly.

In one embodiment, the processor can be further configured to call the first shooting assembly to shoot the environment to obtain the first image. The movable platform further includes a communication interface 650 for data interaction between the movable platform and other terminal devices, and configured to send the first image to the control terminal of the movable platform to cause the control terminal to display the first image. The processor 610 can be further configured to obtain the first area indication information sent by the control terminal, the first area indication information being determined by the control terminal by detecting the user's selection operation of the target object on the first image displayed by the control terminal, and determine the target object to be tracked in the second image and obtain the tracking position area of the target object in the second image according to the first area indication information.

In some embodiments, the processor 610 can be further configured to determine the second area indication information of the second image according to the first area indication information and the relative positional relationship between the first shooting assembly and the second shooting assembly, and perform the target recognition on the area indicated by the second area indication information in the second image to determine the target object and obtain the tracking position area of the target object in the second image.

In one embodiment, the processor 610 can be further configured to call the first shooting assembly to shoot the environment to obtain the first image. The processor 610 can be further configured to determine the tracking position area of the target object in the shooting frame of the first shooting assembly according to the tracking position area of the target object in the second image. The processor 610 can be further configured to mark the target object in the first image according to the tracking position area of the target object in the shooting frame of the first shooting assembly.

In one embodiment, the communication interface 650 can be configured to send the marked first image to the control terminal of the movable platform, such that the control terminal can display the marked first image.

In one embodiment, the processor 610 can be further configured to extract all or some of the image information in the second image information, and add all or some of the image information in the second image information to the marked first image to enrich the contour features of the marked first image.

In some embodiments, the processor 610 can be further configured to determine the tracking position area of the target object in the first image according to the tracking position area of the target object in the second image and the relative positional relationship between the first shooting assembly and the second shooting assembly.

Embodiments of the present disclosure also provide a control device. The control device can be in communication connection with the shooting device, and the shooting device can include the first shooting assembly and the second shooting assembly. The control device is characterized in that the control device includes a memory and a processor.

The memory may be configured to store the computer program. The computer program can include the program instructions.

The processor may be configured to call the program instructions and configured to call the second shooting assembly to shoot the environment to obtain the second image, the imaging modes of the first shooting assembly and the second shooting assembly being different, perform the target object recognition on the second image to obtain the tracking position area of the target object to be tracked in the second image, and adjust the shooting attitude of the shooting device according to the tracking position area of the target object in the second image, such that the target object is located in the shooting frame of the first shooting assembly.

The control device can be provided in the movable platform, and the movable platform can include the control device and the shooting device. The control device may be communicatively connected to the shooting device. The processor of the control device can execute the methods in FIGS. 3 and 4. For the details, reference may be made to the previous sections, and will not be repeated herein.

It should be noted that, for the specific working process of the movable platform described above, reference may be made to the related descriptions in the foregoing embodiments, and details will not be repeated herein.

The integrated units can be stored in a computer readable storage medium when implemented in form of software functional units and sold or used as a standalone product. Based on such understanding, all or part of the technical solution of the disclosure can be embodied in the form of software product stored in a storage medium comprising a number of instructions for causing a computer processor to perform the entire or part of a method consistent with embodiments of the disclosure, such as one of the above-described exemplary methods. The storage medium can comprise a flask disk, a portable hard drive, a read only memory (ROM), a random access memory (RAM), a magnet disk, an optical disk, or other media capable of storing program code.

Those of ordinary skill in the art can understand that all or some of the processes in the methods of the above embodiments can be completed by a computer program instructing relevant hardware. The program may be stored in a computer-readable storage medium, and when the program is executed, it may include the processes of the foregoing method embodiments. The storage medium may include a magnetic disk, an optical disk, a ROM or RAM, or the like.

The above description merely illustrates some embodiments of the disclosure and is not intended to limit the scope of the disclosure. Those of ordinary skill in the art can understand all or some of the processes of implementing the above embodiments. Any equivalent changes in light of the claims of the present disclosure should all be covered by the scope of the present disclosure.

What is claimed is:

1. A target tracking method applicable to a shooting device including a first shooting assembly and a second shooting assembly, comprising:
   calling the first shooting assembly to shoot an environment to obtain a first image;
   calling the second shooting assembly to shoot the environment to obtain a second image;
   sending the first image to a control terminal of a movable platform carrying the shooting device to cause the control terminal to display the first image;
   obtaining first area indication information sent by the control terminal, the first area indication information being determined by the control terminal by detecting a selection operation of a target object to be tracked performed by a user on the first image displayed by the control terminal;
   determining second area indication information of the second image according to the first area indication information and a relative positional relationship between the first shooting assembly and the second shooting assembly;

performing target object recognition on an area indicated by the second area indication information in the second image to determine the target object in the second image to obtain a tracking position area of the target object to be tracked in the second image; and adjusting a shooting attitude of the shooting device according to the tracking position area of the target object in the second image to adjust a location of the target object in a shooting frame of the first shooting assembly.

2. The method according to claim 1, wherein adjusting the shooting attitude of the shooting device includes:

adjusting at least one of an attitude of the movable platform including the shooting device or an attitude of a gimbal carrying the shooting device to adjust the shooting attitude of the shooting device according to the tracking position area of the target object in the second image.

3. The method according to claim 1, wherein the first shooting assembly includes a thermal infrared imaging device, the second shooting assembly includes a visible light imaging device, and the second image includes an optical image.

4. The method according to claim 1, wherein adjusting the shooting attitude of the shooting device includes:

adjusting the shooting attitude of the shooting device according to the tracking position area of the target object in the second image to locate the target object in a preset position area of a shooting frame of the second shooting assembly.

5. The method according to claim 1, wherein adjusting the shooting attitude of the shooting device includes:

determining a tracking position area of the target object in the shooting frame of the first shooting assembly according to the tracking position area of the target object in the second image; and adjusting the shooting attitude of the shooting device according to the tracking position area of the target object in the shooting frame of the first shooting assembly.

6. The method according to claim 1, further comprising:

determining a tracking position area of the target object in the shooting frame of the first shooting assembly according to the tracking position area of the target object in the second image;

marking the target object in the first image according to the tracking position area of the target object in the shooting frame of the first shooting assembly to obtain a marked first image; and sending the marked first image to the control terminal of the movable platform carrying the shooting assembly, such that the control terminal displays the marked first image.

7. The method according to the claim 6, further comprising, after marking the target object in the first image and before sending the marked first image to the control terminal of the movable platform:

extracting at least part of the second image information; and adding the at least part of the second image information to the marked first image.

8. The method according to the claim 6, wherein determining the tracking position area of the target object in the shooting frame of the first shooting assembly includes:

determining the tracking position area of the target object in the shooting frame of the first shooting assembly according to the tracking position area of the target object in the second image and the relative positional relationship between the first shooting assembly and the second shooting assembly.

9. A movable platform comprising:

a shooting device including a first shooting assembly and a second shooting assembly, imaging modes of the first shooting assembly and the second shooting assembly being different;

a communication interface;

a control terminal;

a memory storing a computer program including program instructions; and a processor configured to execute the program instructions to:

call the first shooting assembly to shoot an environment to obtain a first image;

call the second shooting assembly to shoot the environment to obtain a second image;

send, via the communication interface, the first image to the control terminal to cause the control terminal to display the first image;

obtain first area indication information sent by the control terminal, the first area indication information being determined by the control terminal by detecting a selection operation of a target object to be tracked performed by a user on the first image displayed by the control terminal;

determine second area indication information of the second image according to the first area indication information and a relative positional relationship between the first shooting assembly and the second shooting assembly;

perform target object recognition on an area indicated by the second area indication information in the second image to determine the target object in the second image to obtain a tracking position area of the target object to be tracked in the second image; and adjust a shooting attitude of the shooting device according to the tracking position area of the target object in the second image to adjust a location of the target object in a shooting frame of the first shooting assembly.

10. The movable platform according to the claim 9, further comprising:

a gimbal carrying the shooting device;

wherein the processor is further configured to execute the program instructions to adjust at least one of an attitude of the movable platform or an attitude of the gimbal to adjust the shooting attitude of the shooting device according to the tracking position area of the target object in the second image.

11. The movable platform according to the claim 9, wherein the first shooting assembly includes a thermal infrared imaging device, the second shooting assembly includes a visible light imaging device, and the second image includes an optical image.

12. The movable platform according to claim 9, wherein the processor is further configured to execute the program instructions to:

adjust the shooting attitude of the shooting device according to the tracking position area of the target object in the second image to locate the target object in a preset position area of a shooting frame of the second shooting assembly.

13. The movable platform according to the claim 9, wherein the processor is further configured to execute the program instructions to:

determine a tracking position area of the target object in the shooting frame of the first shooting assembly according to the tracking position area of the target object in the second image; and adjust the shooting attitude of the shooting device according to the tracking position area of the target object in the shooting frame of the first shooting assembly.

14. The movable platform according to the claim 9, wherein:

the processor is further configured to execute the program instructions to:

determine a tracking position area of the target object in the shooting frame of the first shooting assembly according to the tracking position area of the target object in the second image; and mark the target object in the first image according to the tracking position area of the target object in the shooting frame of the first shooting assembly to obtain a marked first image; and the communication interface is configured to send the marked first image to the control terminal of the movable platform, such that the control terminal displays the marked first image.

15. The movable platform according to the claim 14, wherein the processor is further configured to execute the program instructions to, after marking the target object in the first image and before sending the marked first image to the control terminal of the movable platform:

extract at least part of the second image information; and add in the at least part of the second image information to the marked first image.

16. The movable platform according to the claim 14, wherein the processor is further configured to execute the program instructions to:

determine the tracking position area of the target object in the shooting frame of the first shooting assembly according to the tracking position area of the target object in the second image and the relative positional relationship between the first shooting assembly and the second shooting assembly.

\* \* \* \* \*